United States Patent
French

(10) Patent No.: US 8,769,121 B2
(45) Date of Patent: Jul. 1, 2014

(54) MULTI-SESSION WEB ACCELERATION

(76) Inventor: Daren French, Irvine, CA (US)

( * ) Notice: Subject to any disclaimer, the term of this patent is extended or adjusted under 35 U.S.C. 154(b) by 81 days.

(21) Appl. No.: 12/404,324

(22) Filed: Mar. 15, 2009

(65) Prior Publication Data

US 2010/0235521 A1 Sep. 16, 2010

(51) Int. Cl.
*G06F 15/16* (2006.01)
*H04L 29/08* (2006.01)
*H04L 29/06* (2006.01)
*G06F 13/14* (2006.01)
*G06F 13/16* (2006.01)

(52) U.S. Cl.
CPC .......... *H04L 67/1074* (2013.01); *H04L 67/104* (2013.01); *H04L 65/4015* (2013.01); *G06F 13/14* (2013.01); *G06F 13/1615* (2013.01)
USPC .......................................................... 709/228

(58) Field of Classification Search
CPC . G06F 13/14; G06F 13/1615; H04L 65/4015; H04L 67/104; H04L 67/1074
USPC .................... 709/219, 227, 228; 370/342, 352
See application file for complete search history.

(56) References Cited

U.S. PATENT DOCUMENTS

| | | | |
|---|---|---|---|
| 5,996,001 A * | 11/1999 | Quarles et al. | 709/203 |
| 7,593,922 B1 * | 9/2009 | Wright et al. | 1/1 |
| 7,613,170 B1 * | 11/2009 | Grabelsky et al. | 370/352 |
| 2002/0083133 A1 * | 6/2002 | Feigenbaum | 709/203 |
| 2002/0194318 A1 * | 12/2002 | Cooper et al. | 709/223 |
| 2004/0039757 A1 * | 2/2004 | McClure | 707/201 |
| 2005/0149529 A1 * | 7/2005 | Gutmans | 707/10 |
| 2006/0168318 A1 * | 7/2006 | Twiss | 709/238 |
| 2006/0184688 A1 * | 8/2006 | Ganguly et al. | 709/232 |
| 2007/0157112 A1 * | 7/2007 | Peters | 715/786 |
| 2009/0010426 A1 * | 1/2009 | Redmond | 380/29 |
| 2009/0055461 A1 * | 2/2009 | Georgis et al. | 709/201 |
| 2011/0270929 A1 * | 11/2011 | Harrang et al. | 709/205 |

* cited by examiner

*Primary Examiner* — Peter Shaw
(74) *Attorney, Agent, or Firm* — Fish & Tsang, LLP

(57) ABSTRACT

A method for speeding up data downloads across the Internet utilizing a proxy server to receive client requests for downloading remote data files and then establishing multiple concurrent sessions from the proxy server which balance the download of the remote data in multiple segments across two or more available wide-area network (WAN) links.

13 Claims, 3 Drawing Sheets

MULTI-SESSION WEB ACCELERATION

BACKGROUND

In computer networks, such as the Internet, end-users utilize various methods to download remote data files. These data files contain various types of information which is required by the end-user. In many cases these files contain certain types of information which cause them to naturally take longer to download. The ability to speed up the download of the remote data files is of value to the end-user as it would save time and produce a better overall experience.

In particular web-based traffic, using the HTTP protocol, is useful as it allows for data to be downloaded in segments. This ability to segment downloads provides an opportunity for devices like the XRoads Networks appliance which already load balance network traffic, including web traffic, to speed up these data downloads by providing further segmenting of a web-download so that multiple segments can be distributed over multiple WAN links using multiple sessions.

The XRoads Networks appliance already includes a web proxy service, which currently proxy's web requests and load balances those requests across multiple links. This method extends that capability to intercept those sessions based on specific content types and then further split up those sessions using techniques similar. to previous download manager applications.

Many products today are capable of splitting a data download into multiple segments; specifically web-based downloads, such as the FreeDownloadManager application which our S2S Download Accelerator is based on, which was originally developed based on the technology developed by GetRight in 1999.

The problem normal download accelerators is that they do not have the ability to split traffic between multiple WAN links, and thus are not able to improve performance by utilizing multiple link and provide reliability in the event that a WAN link fails.

Further there are other products on the market today which incorporate proxy services, such as web proxy engines like Squid developed in 2002. These applications receive requests from clients and then proxy those requests over the WAN. These devices typically use only a single path and/or gateway appliance for forwarding their traffic. XRoads Networks provides a unique solution in comparison as it is able to balance web-based traffic across multiple WAN links. This solution was originally developed in late 2006 and released as part of our partnership with Netsweeper.

The problem with web proxy devices is that they to do not have the ability to split traffic between multiple WAN links, and thus are not able to improve performance by utilizing multiple links and provide reliability in the event that a WAN link fails.

XRoads Networks has already solved part of this problem by modifying how our web proxy engine works so that sessions can be split across multiple WAN links.

Finally, there are other products on the market which receive requests from clients and splits those requests into partial download requests which are then distributed across multiple WAN links, these products then forward the responses from those requests back to the original requestor.

The problem with these new solutions is that while they may be able to forward the inbound connections they lack the ability to balance traffic without segmentation, and thus the functionality utilizes a large number of system resources, i.e. processing power and memory utilization.

It is only when you add the ability to offload traffic to another load balancing mechanism which does not require the more processor and memory intensive functions as segmentation within the same appliance where you see added benefits. This capability provides for faster throughput and better memory handling, thus the aforementioned solutions must use greater processing power to maintain the information about each session which reduces its scalability and lowers its overall ROI. This is a significant difference as it greatly affects pricing and overall market appeal.

The XRoads Networks solution, as described in this document, takes advantage of both segmentation and non-segmentation techniques, through the use of content based redirection, to maximum each client connection and thus optimize the overall network connectivity for our customers.

SUMMARY

The present invention seeks to provide a novel apparatus and method for efficiently and accurately proxying communication sessions between clients and one or more servers across two or more WAN links with each session being split into separate data segments, thus producing separate outbound sessions for each segment, in order to improve the overall speed of downloading the remote data file requested by the client originating the initial session.

There is thus provided in accordance with a preferred embodiment of the present invention a method for a proxy controller which manages the incoming client sessions and the outbound download sessions.

The proxy controller is responsible for determining when incoming client sessions are to be proxied, and if proxied whether the proxied connection should be segmented or simply balanced without segmentation.

The proxy controller basis its decision for proxying based on the application type. It further determines whether a proxied connection should be segmented based on content type.

Upon a determination that segmentation is required the proxy controller takes the initial client session and determines how many segments can be created and thus the number of corresponding outbound sessions. The proxy controller then initiates the outbound sessions downloading the different data segments of the original remote data file requested by the client. The proxy controller will initiate the sessions to as many servers as possible identified to hold the remote data file. These sessions will be split across the various available WAN links.

The availability of the WAN links and the process for load balancing the sessions across the WAN links is determined based on our Vector Routing technology and methodologies (reference patent filing 20060187820, and patent filing 20060187842) which works in conjunction with the proxy controller.

DESCRIPTION OF DRAWING

The present invention can be understood and better appreciated from the following detailed descriptions, taken in conjunction with the following drawings.

DETAILED DESCRIPTION OF PREFERRED EMBODIMENTS

Figure 1:
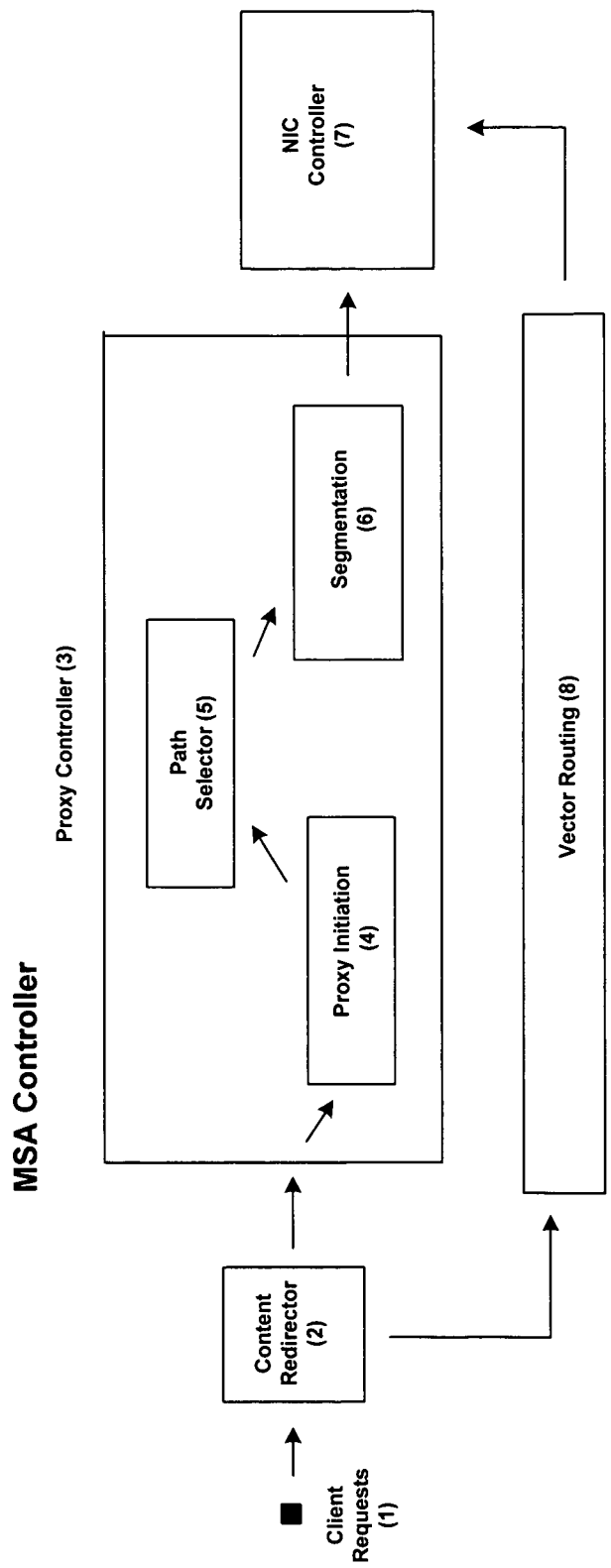
FIG. 1—A pictorial illustration of a typical process by which the Multi-Session Acceleration is constructed and operative in accordance with the preferred embodiment of the present invention.

Reference is now made to FIG. 1 that provides the general flow of the proxy controller.

The proxy controller, as detailed in the diagram below consists of several components, including a content redirection module which incorporates a decision algorithm used to determine which client requests (1) are forwarded [based on examining the initial client SYN packet] to the proxy controller (3), and which client requests (1) or sent on to other mechanisms for load balancing (8).

Client requests (1) which are forwarded to our MSA Controller or Proxy Controller (3) are initially terminated by the Proxy Initiation (4) module which terminates the incoming client session and initiates one or more new sessions across one or more WAN gateway connections. The Proxy Initiator (4) determines where the new sessions will go by working with the Path Selector (5) which gives the Proxy Initiator (4) the appropriate IP address to use from which a new session will be initiated from based on configuration information provided to the Proxy Controller (2).

The Path Selection (5) keeps track of how many times each configured IP address has been provided to the Proxy Initiation module and determines which address to provide next based on that information as well as other link utilization metrics.

Once the new proxy session is ready to be initiated by the Proxy Initiator (4) another request is made to the Segmentation (6) module to determine whether the proxy'd session can be further segmented to achieve faster throughput. The Segmentation (6) module then performs several tests to the URL as obtained in the original Client Request (1) to determine if multiple servers exist from which to obtain the remote date or whether any of the remote servers are able to segment the data file being requested on a per session basis.

If the Segmentation (6) module determines that segmentation is possible, then the Proxy Initiation (4) will create multiple new sessions from the original Client Request (1) and which are then load balanced using the IP address information from the Path Selector (5). All new sessions are then sent to the NIC Controller (7) for delivery on to the network.

Figure 2:
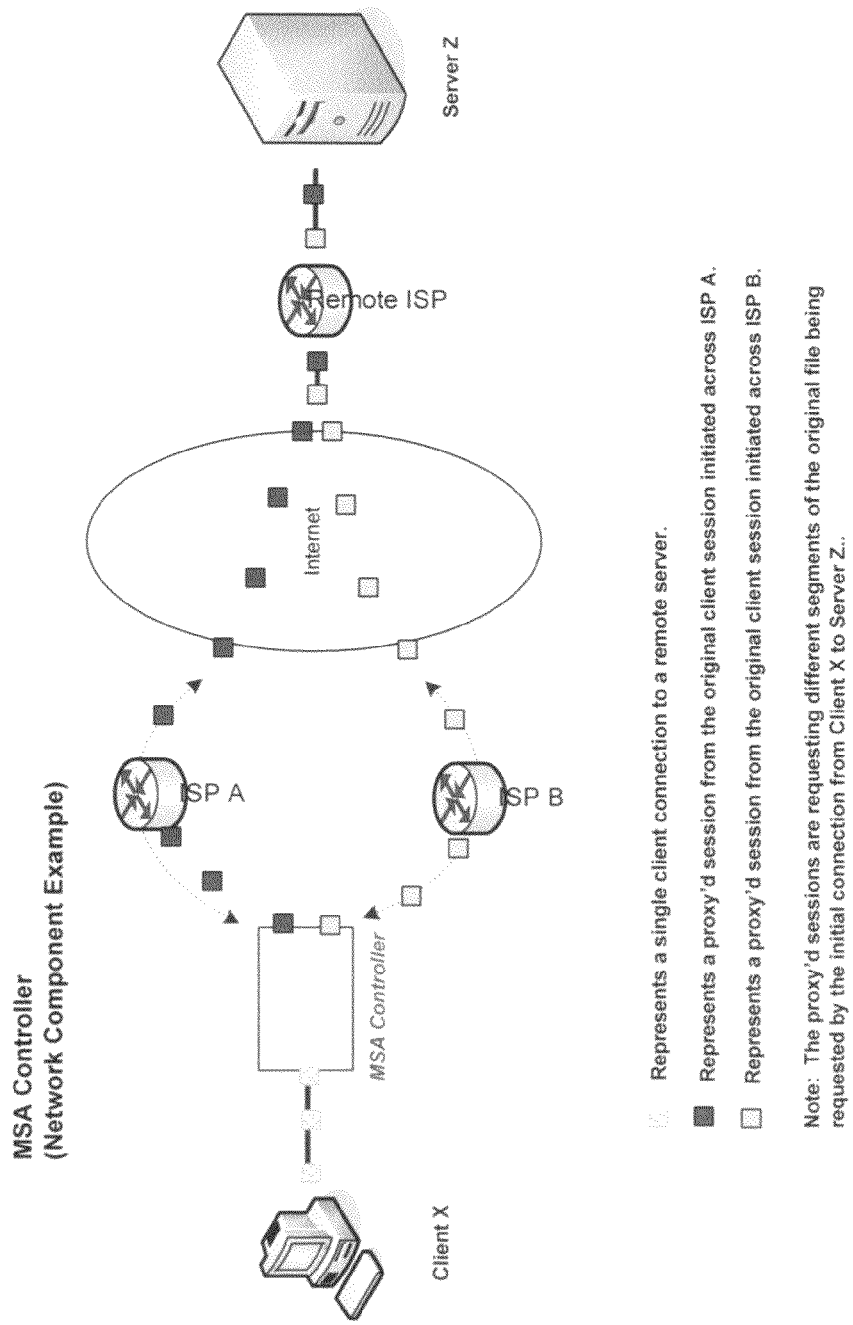
FIG. 2 A pictorial illustration of the typical network components used in our patent, this diagram is simply to provide content for the present invention.

Reference is now made to FIG. 2 that provides the general flow of the present invention.

The present invention as illustrated below is used to split a single client communications session (from Client X) in to multiple outbound requests via ISP A and ISP B to the destination server (Server Z). The MSA Controller acts as an intermediary between the single client connection and the multiple server connections.

Figure 3:
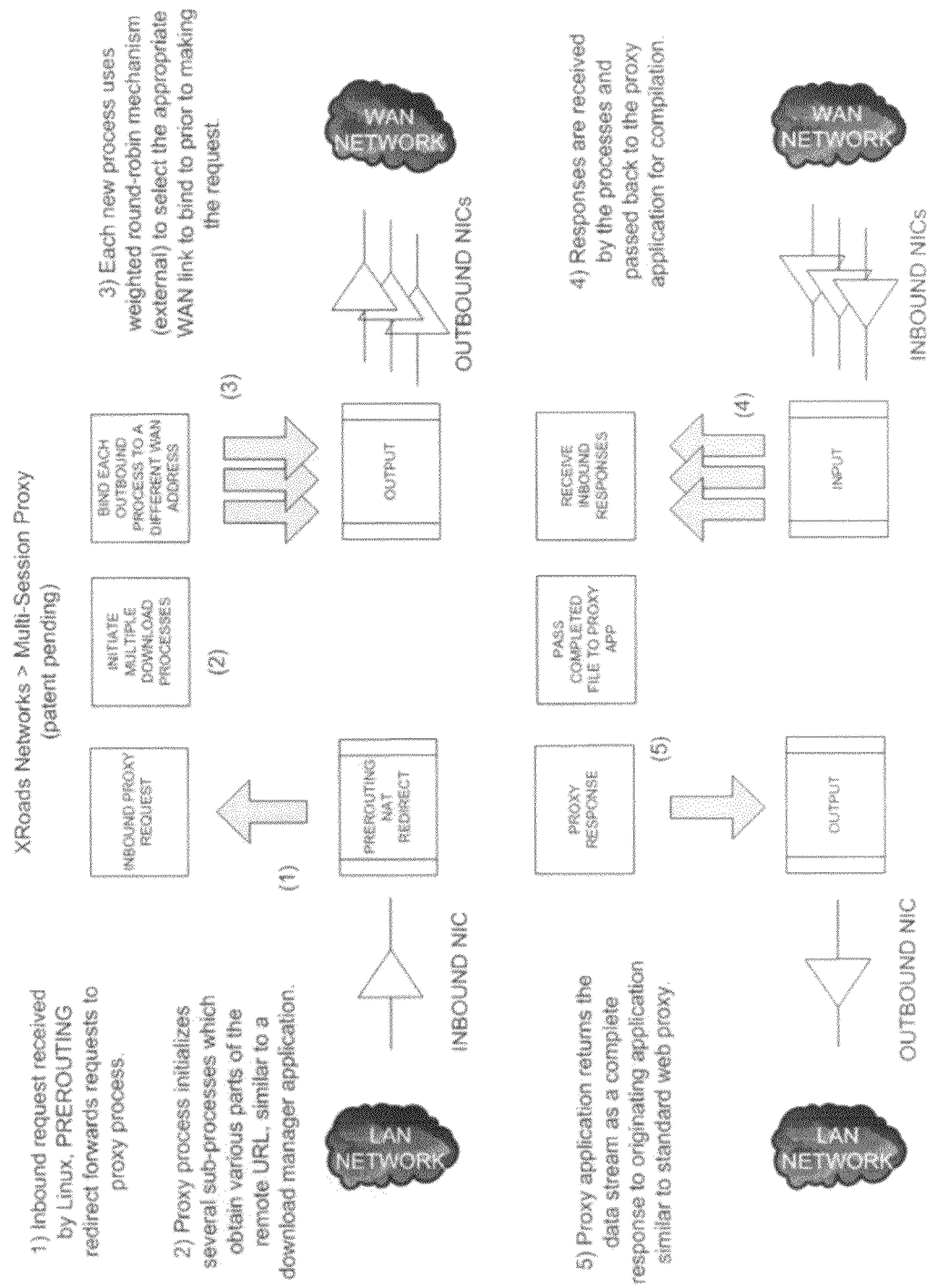
FIG. 3—A pictorial illustration of the decision tree (flow diagram) of the present invention.

Reference is now made to FIG. 3 that provides the general flow diagram of the decision process made by the various components which make up the MSA proxy controller. The proxy controller, consists of several components, including a decision algorithm to determine which sessions are forwarded to the proxy controller I, which sessions are to be segmented (based on content type) 2, and then how the individual segmented sessions are to be balanced across the various available WAN links 3. Further processes include the reception of the session responses 4, and the response of proxy'd data back to the client 5.

REFERENCES CITED

Squid Proxy 2.5, release September 2002.
FMD (Download Management), released June 2004. New Features in GetRight 4.x, November 1999.
Multi-Session Web Proxy White Paper, September 2006.
Multi-Session Web Proxy Service v1, released January 2007.
S2S Download Accelerator, released October 2007.
Multi-Session Web Proxy Service v2, released August 2008.
Multi-Session Web Acceleration, released March 2009.
Request for comments 2612, June 1999.
Request for comments 3040, January 2001.
Patent Application, Vector Routing 20060187820, February 2005.
U.S. Pat. No. 6,339,785, January 2002.
U.S. Pat. No. 6,337,974, January 2002.
U.S. Pat. No. 7,047,309, May 2006.

The invention claimed is:

1. A method for effecting inbound concurrent session balancing for a client of a local area network utilizing a client-side proxy controller having a first IP address and a second IP address, with respect to downloading a remote data file from a first remote server, comprising the proxy controller:
   receiving a download request from a client-side target for the remote data file;
   splitting the download request into a first outbound session request having a first source address and a second outbound session request having a second source address, wherein the first source address is the first IP address of the proxy controller and the second source address is the second IP address of the proxy controller;
   using information found in the download request and at least one link utilization metric in a path selector to initiate the first and second outbound session requests to the first remote server via the first and second IP address respectively;
   wherein the first outbound session request is used to initiate download of a first segment of the remote data file across a first network gateway connection associated with the first IP address, and the second outbound session request is used to initiate a partially concurrent download of a second segment of the remote data file across a second network gateway connection associated with the second IP address and different from the first network gateway connection, as selected by the path selector, and wherein the first and second network gateways connections are local to the proxy controller.

2. The method of claim 1, further comprising the proxy controller intercepting the download request from the client based on at least one of port number, protocol type, and string information within the request.

3. The method of claim 1, further comprising the proxy controller making a determination as to whether a second download request from the client should be segmented or balanced by the proxy controller without segmentation.

4. The method of claim 1, further comprising the proxy controller using the information found in the download request to initiate a third outbound session request, which is used to initiate download of a third segment of the remote data file across a third network gateway, where the third network gateway is different from the first and second network gateways.

5. The method of claim 1, further comprising using the proxy controller to load balance across the first and second network gateways by determining the respective statuses of different first and second network connections to a WAN, based at least in part on at least one of gateway testing, and remote device probing.

6. The method of claim 1, further comprising the proxy controller balancing the first and second outbound sessions at least in part based on at least one of respective path latency, packet loss, and jitter of the first and second gateway connections.

7. The method of claim 1, wherein the remote data file can be characterized as having a type of content, and further comprising the proxy controller intercepting the download request from the client at least in part based on the type of content that characterizes the remote data file.

8. The method of claim 1, further comprising the proxy controller using the information found in the download request to initiate a third outbound session request, which is used to initiate an at least partially concurrent download of a portion of the remote data file matching the first segment from a second remote server.

9. The method of claim 1, wherein a second download request from the client is not intercepted by the proxy controller, and is instead passed to a standard link load balancing system that provides for the balancing of non-proxied sessions.

10. The method of claim 1, wherein each of the first and second segments pass through the proxy controller to the client.

11. The method of claim 1, wherein the client comprises the target.

12. The method of claim 1, wherein the proxy controller caches the first and second segments.

13. The method of claim 1, wherein the first and second network gateway connections are between a LAN (local area network) and a WAN (wide area network).

* * * * *